United States Patent
Yoshikawa et al.

(10) Patent No.: US 7,889,310 B2
(45) Date of Patent: Feb. 15, 2011

(54) METHOD FOR PRODUCING APERTURES IN A DIFFUSE REFLECTOR LAYER HAVING A METAL REFLECTION FILM

(75) Inventors: Takehisa Yoshikawa, Yokohama (JP); Masayuki Kyoi, Yokohama (JP); Yasushi Sugimoto, Tsukuba (JP); Masato Taya, Chikusei (JP); Takeshi Yoshida, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 700 days.

(21) Appl. No.: 11/623,771

(22) Filed: Jan. 17, 2007

(65) Prior Publication Data

US 2007/0177079 A1 Aug. 2, 2007

(30) Foreign Application Priority Data

Jan. 18, 2006 (JP) .............................. 2006-010117

(51) Int. Cl.
*G02F 1/13* (2006.01)

(52) U.S. Cl. .................... 349/187; 349/114; 349/95; 349/64

(58) Field of Classification Search ................ 349/114, 349/113, 95, 187, 57, 64, 65, 138; 359/619, 359/626, 620, 642; 427/162
See application file for complete search history.

(56) References Cited

U.S. PATENT DOCUMENTS

| | | | |
|---|---|---|---|
| 6,437,918 B1 * | 8/2002 | Hamanaka et al. .......... 359/620 |
| 6,452,654 B2 * | 9/2002 | Kubo et al. .................. 349/114 |
| 6,597,510 B2 * | 7/2003 | Bunkenburg et al. ........ 359/620 |
| 6,633,351 B2 * | 10/2003 | Hira et al. ...................... 349/95 |
| 6,654,176 B2 * | 11/2003 | Yoshikawa et al. .......... 359/627 |
| 6,822,707 B2 * | 11/2004 | Ariyoshi et al. ............. 349/112 |
| 7,245,335 B2 * | 7/2007 | Watanabe ..................... 349/64 |
| 2002/0039157 A1 * | 4/2002 | Nakanishi et al. ............. 349/95 |

FOREIGN PATENT DOCUMENTS

| JP | 2001-116917 | 4/2001 |
|---|---|---|
| JP | 2003-084276 | 3/2003 |
| JP | 2003-121612 | 4/2003 |
| JP | 2003-255318 | 9/2003 |
| JP | 2004-109644 | 4/2004 |
| JP | 2004-118106 | 4/2004 |

* cited by examiner

*Primary Examiner*—Thoi V Duong
(74) *Attorney, Agent, or Firm*—Antonelli, Terry, Stout & Kraus, LLP.

(57) ABSTRACT

A transflective type liquid crystal display has display side members; rear side members which include a diffuse reflector layer with apertures, and a glass substrate; and a liquid crystal layer interposed between the display side members and the rear side members, wherein on the opposite side from the diffuse reflector layer, the glass substrate has aperture-forming lenses used for exposure and removal during formation of the apertures of the diffuse reflector layer, and a flattening layer used to flatten a concave and convex surface produced by the aperture-forming lenses. This makes it possible to implement a transflective type liquid crystal display with excellent visibility regardless of whether an external light or internal lighting source is used.

7 Claims, 9 Drawing Sheets

METHOD FOR PRODUCING APERTURES IN A DIFFUSE REFLECTOR LAYER HAVING A METAL REFLECTION FILM

The present application is based on and claims priority of Japanese patent application No. 2006-010117 filed on Jan. 18, 2006, the entire contents of which are hereby incorporated by reference.

BACKGROUND OF THE INVENTION

The present invention relates to a liquid crystal display. More particularly, it relates to a transflective type liquid crystal display which provides good screen visibility in outdoor use such as under sunlight as well as in indoor use.

Liquid crystal displays, which do not emit light by themselves in principle and display a screen using optical shutter effect caused by polarization, are roughly classified into three types according to the lighting source they use: transmissive type, reflection type, and transflective type.

The transmissive type LCD has a back light at the back as a lighting source. The back light needs to be lit continuously for screen display and the screen cannot be displayed when the back light is off. The reflection type LCD contains a reflective film to reflect external light and displays a screen using the external light as a lighting source. This type has an advantage in that it consumes minimal power because it does not use a back light, but it poses a problem as to how to ensure visibility because display brightness varies with the ambient brightness and the screen can hardly be recognized in dim light during the night. The transflective type LCD has a reflective film which reflects external light. In a bright environment, this type of LCD displays a screen using external light as a lighting source. In a dim environment, it displays a screen using a back light installed at the back.

Thus, the reflective film has apertures for use to pass the back light and the screen is displayed using light from the back light passing through the apertures, as a lighting source. The transflective type LCD, which can reduce power consumption using external light and make a screen easily recognizable even in a bright ambient environment in the daytime, is suitable, in particular, for mobile terminal devices such as cell phones, of which power savings are required. However, since this type has apertures in the reflective film and switches between external light and back light depending on the situation, the visibility of the screen varies between the two lighting sources—external light and back light—depending on the area of the apertures. There is a trade-off between the two lighting sources, with results in decreased visibility in both reflective display and transmissive display. The light from the back light, in particular, is blocked by that part of the reflective film where there are no apertures, resulting in decreased brightness.

To deal with this situation, Japanese Patent Laid-Open Publication Nos. 2003-84276 and 2003-255318 disclose techniques for increasing screen brightness during the use of an internal lighting source by focusing the light from a back light onto the apertures using microlenses while increasing screen brightness during the use of external light by reducing the area of the apertures in the reflective film. Also, Japanese Patent Laid-Open Publication Nos. 2001-116917 and 2003-121612 disclose methods for manufacturing an optical part equipped with microlenses.

SUMMARY OF THE INVENTION

The technique disclosed in Japanese Patent Laid-Open Publication No. 2003-84276 can minimize the light blocked by the reflective film by focusing light onto the apertures using the microlenses installed between the back light and liquid crystal screen, but positioning between the lenses and apertures is not perfect and misalignment between the lenses and the centers of apertures can reduce light collection efficiency. Also, there is difference in shape between the apertures and focused portions. Consequently, the area of the reflective film is decreased in these parts, causing reduction in screen brightness produced by reflected light, and the light from the back light is blocked, causing a loss in transmitted light.

The technique disclosed in Japanese Patent Laid-Open Publication No. 2003-255318 forms planar gradient-index microlenses on glass at the back by a diffusion reaction using, as a photomask, micro apertures provided beforehand in the reflective film. This technique can produce lenses without misalignment with the center positions of the apertures. However, the use of a diffusion reaction which takes place through a photomask made up of micro holes results in difficulty of lens profile control, making it a challenge to form an ideal curve. Also, it is difficult to perform linear quadratic control of the microlenses and prepare lens arrays with different aspect ratios in order to correct a direction dependency of the light from the back light and viewing angle of the screen.

With the technique disclosed in Japanese Patent Laid-Open Publication No. 2001-116917, in optical parts including microlenses, light proof layers installed face-to-face via self alignment of the microlenses are arranged coaxially with the lenses. With this technique, microlenses are formed using a stamper. In order to form the microlenses on a glass substrate, the glass substrate must be exposed from behind. This makes it difficult to form the lenses on a liquid crystal display on which interconnects and the like have been formed.

The technique disclosed in Japanese Patent Laid-Open Publication No. 2003-121612 is capable of forming lens surfaces with high form accuracy on a glass substrate using a transparent film.

The present invention has an object to solve the above problems and provide a liquid crystal display of a transflective or other type with excellent visibility regardless of whether an external light or internal lighting source is used.

To achieve the above object, according to a first aspect, aperture-forming lenses for use to produce transmission apertures in a diffuse reflector layer by exposure and removal and a flattening layer for use to flatten concave and convex surfaces of the aperture-forming lenses are placed on the back of a glass substrate in a liquid crystal display.

To achieve the above object, according to a second aspect, an index of refraction of material of the aperture-forming lenses according to the first aspect is higher than an index of refraction of the flattening layer by 0.02 to 0.25. More preferably, it is higher by 0.05 to 0.15.

To achieve the above object, according to a third aspect, the aperture-forming lenses according to the first or second aspect are formed using a film material having a lens profile. The film material is reverse-formed using a die built by cutting, as a transfer master pattern.

To achieve the above object, according to a fourth aspect, the liquid crystal display according to the first aspect is applied to a personal digital assistant used in various environments such as in external light, in bright light indoors, and dim light indoors, especially to a screen of a cell phone.

The present invention makes it possible to obtain a liquid crystal display of a transflective type with excellent visibility regardless of whether an external light or internal lighting source is used.

BRIEF DESCRIPTION OF THE DRAWING

These and other features, objects and advantages of the present invention will become more apparent from the following description when taken in conjunction with the accompanying drawings wherein.

DETAILED DESCRIPTION OF PREFERRED EMBODIMENTS

The best mode for carrying out the present invention will be described.

Transflective type liquid crystal displays, a cell phone, and a personal digital assistant as well as a method for producing apertures in a diffuse reflector layer according to embodiments of the present invention will be described below with reference to the drawings.

First Embodiment

Figure 1:
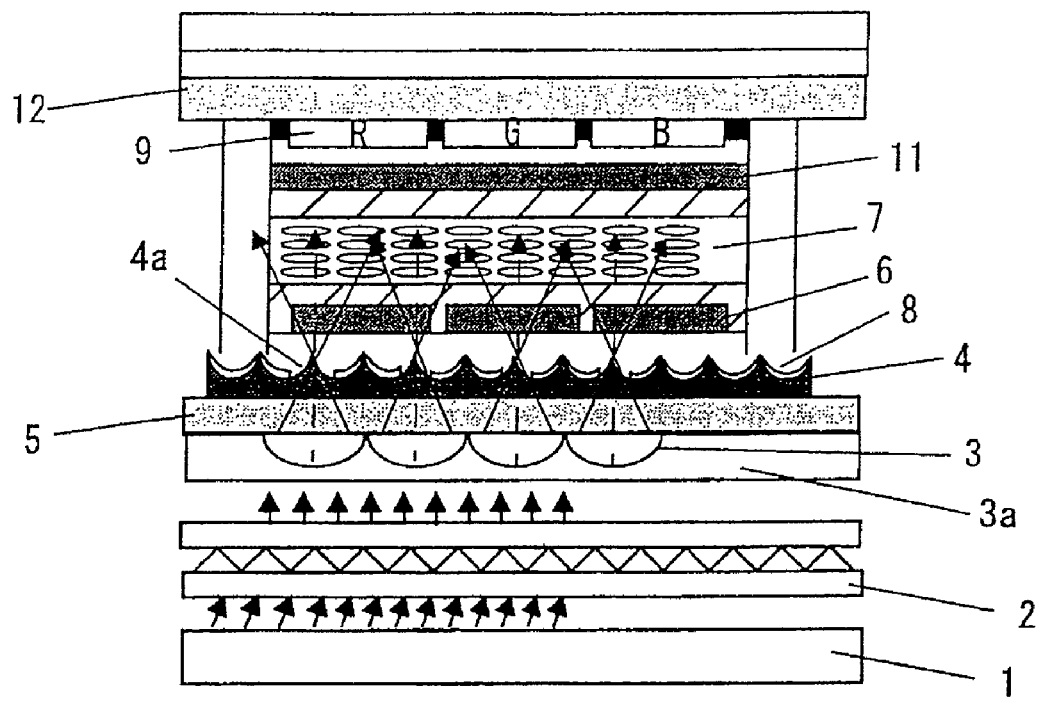
FIG. 1 is a sectional view illustrating a transflective type liquid crystal display according to a first embodiment of the present invention.

A first embodiment will be described. FIG. 1 is a sectional view of a transflective type liquid crystal display equipped with aperture-forming lenses and a diffuse reflector layer according to this embodiment. The liquid crystal display consists of display side members, a liquid crystal layer 7, and rear side members. The display side members include a color filter 9, a display side electrode 11, and an upper glass substrate 12. The liquid crystal layer 7 is interposed between the display side members and rear side members. The rear side members include a back light 1, a prism lens sheet 2, aperture-forming lenses 3, a flattening layer 3a, a diffuse reflector layer 4, a glass substrate 5, and a rear side electrode 6.

Apertures 4a are formed in the diffuse reflector layer 4. In the direction in which the light led from the back light 1 through the prism lens sheet 2 passes, the centers of the apertures 4a are coaxial with the center positions of the aperture-forming lenses 3. This is because the apertures 4a are formed by self-aligned exposure using the aperture-forming lenses 3. Incidentally, the diffuse reflector layer 4 itself is made of a transparent resin, and a metal film 8 formed on the diffuse reflector layer 4 reflects the light incident upon an upper surface of the diffuse reflector layer 4.

Figure 2:
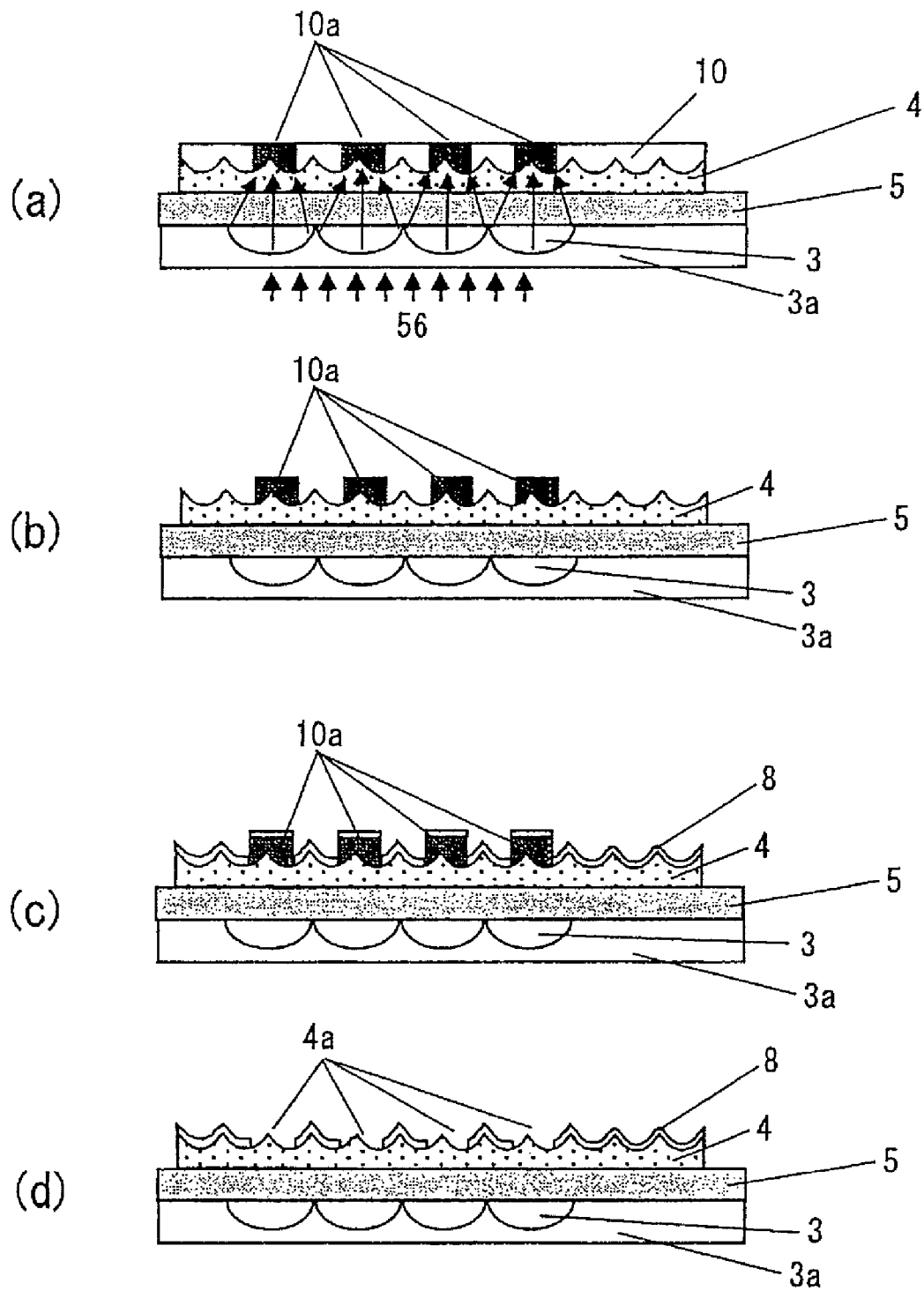
FIG. 2 is a process chart illustrating a manufacturing process of a diffuse reflector layer in the first embodiment.

FIG. 2 is an explanatory diagram illustrating a manufacturing process for forming the apertures 4a in the diffuse reflector layer 4. FIG. 2A shows the glass substrate 5 on which the diffuse reflector layer 4 is formed. The diffuse reflector layer 4 is coated with positive type photosensitive resin 10. The aperture forming lenses 3 are formed on a lower surface of the glass substrate 5 and the flattening layer 3a is formed under the aperture forming lenses 3.

Now, procedures for forming the apertures 4a will be described. The glass substrate 5 is irradiated with actinic light 56 such as UV light on the side on which the aperture-forming lenses 3 are formed. The actinic light 56 is collected by the aperture-forming lenses 3 and directed at the photosensitive resin 10 on the diffuse reflector layer 4. Consequently, irradiated part 10a of the photosensitive resin 10 is sensitized as indicated by solidly shaded areas in FIG. 2A.

Next, unnecessary part of the photosensitive resin 10 is removed by etching, leaving the sensitized part of the photosensitive resin 10 as a photomask 10a on the diffuse reflector layer 4 as shown in FIG. 2B.

Next, the metal film 8 of aluminum, silver, or the like is deposited on the diffuse reflector layer 4 by sputtering or other method as shown in FIG. 2C. Preferably, thickness of the metal film 8 is between 0.01 μm and 1 μm. Consequently, the metal film 8 is deposited on the diffuse reflector layer 4 and photomask 10a.

Then, as the photomask 10a is lifted off, it is removed together with the metal film 8 on it to form the transmission apertures 4a shown in FIG. 2D. Since the apertures 4a are formed by exposure using the aperture-forming lenses 3, their center positions coincide with those of the aperture-forming lenses 3 without misalignment. Also, since the metal film 8 remains on the diffuse reflector layer 4 except for the apertures 4a, the light incident upon the diffuse reflector layer 4 is reflected.

Figure 3:
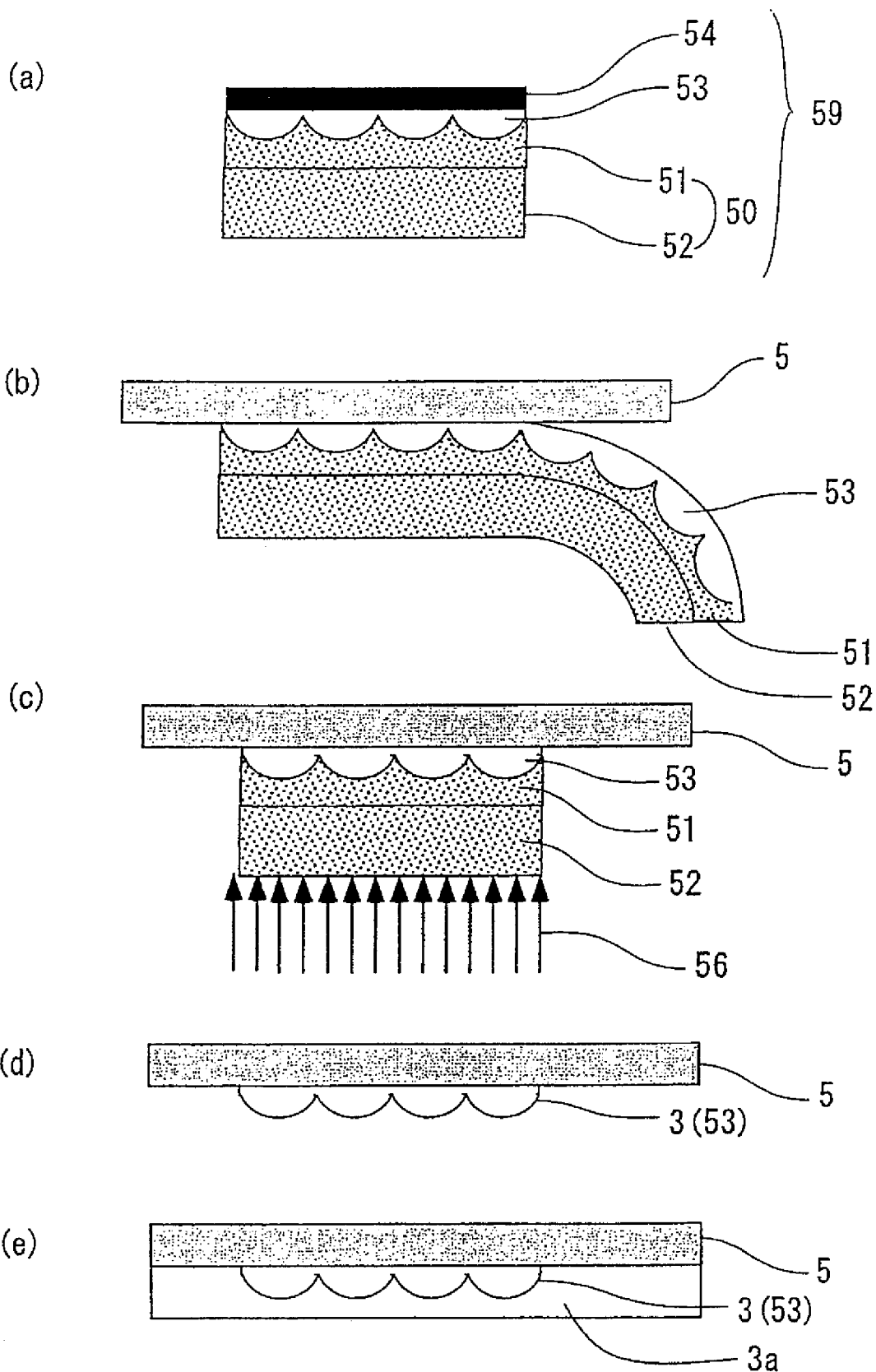
FIG. 3 is a process chart illustrating a process for forming microlenses on a glass substrate in the first embodiment.

Next, a method for creating the aperture-forming lenses 3 on the glass substrate 5 will be described with reference to FIG. 3. FIG. 3 is a sectional view illustrating a process for creating the aperture-forming lenses 3. FIG. 3A is a partial sectional view illustrating a transfer laminate 59 used to manufacture the aperture-forming lenses 3 according to this embodiment. In FIG. 3A, the transfer laminate 59 consists of a base film 52, underlying layer 51, thin film layer 53, and cover film 54 stacked in this order, where the base film 52 and the underlying layer 51 with a concave and convex pattern constitute a concave and convex pattern-bearing film 50.

Next, description will be given of a method for manufacturing the aperture-forming lenses 3 using the transfer laminate 59. The thin film layer 53 is revealed by peeling off the cover film 54 from the transfer laminate 59 shown in FIG. 3A. The revealed thin film layer 53 is brought into intimate contact with the glass substrate 5 at the back of the liquid crystal display.

FIG. 3B is a partial sectional view showing how the transfer laminate 59 from which the cover film 54 has been removed is brought into intimate contact with the glass substrate 5 of the liquid crystal panel. As shown in the figure, the revealed surface of the thin film layer 53 is pressed against the glass substrate 5. Preferably, a heating and pressing rubber roller (not shown) is used to press sufficiently in a uniform manner.

FIG. 3C is a partial sectional view showing the same structure as in FIG. 3B except that a photocurable resin is used for the thin film layer 53. The photocurable resin, if it is used for the thin film layer 53, is cured by actinic light 56 such as UV light as shown in FIG. 3C. This makes it possible to peel off the underlying layer 51 easily from the thin film layer 53 with the thin film layer 53 kept in intimate contact with the glass substrate 5 and with the concave and convex pattern maintained sufficiently.

However, according to this embodiment, the process in FIG. 3C is not strictly necessary. FIG. 3D is a partial sectional view showing the same structure as in FIG. 3B after the base film 52 and underlying layer 51 are peeled off. As shown in the figure, the removal of the underlying layer 51 and base film 52 from the thin film layer 53 leaves the thin film layer 53 with the shape of the aperture-forming lenses 3 on the glass substrate 5. Next, as shown in FIG. 3E, the flattening layer 3a is formed to flatten the concave and convex surfaces of the aperture-forming lenses 3 created from the thin film layer 53.

In FIG. 3, the aperture-forming lenses 3 are 10 μm in diameter and 0.3 μm high. The radius of curvature of the lens is 44 μm. The material of the aperture-forming lenses 3 has an index of refraction of 1.52 to 1.62 and the material of the flattening layer 3a has an index of refraction of 1.42 to 1.52. The glass substrate 5 is 0.5 mm thick.

Preferably, a roller laminator is used to stack the transfer laminate 59 on the glass substrate 5. It heats the glass substrate 5, puts it between a compressable rubber roll and the base film, and feeds the glass substrate 5 while pressing the transfer laminate 59 against the glass substrate 5 by rotating the roll. Preferably, film thickness of the thin film layer 53 formed on the glass substrate 5 in this way is between 0.2 m and 10 μm.

It is easier to reproduce the concave and convex pattern if the film thickness of the thin film layer 53 before the underlying layer 51 with the concave and convex pattern is pressed against the thin film layer 53 is larger than maximum height difference of the concave and convex pattern of the underlying layer 51. Equal thickness may cause convex part of the underlying layer 51 to break through the thin film layer 53. When the thin film layer 53 is made of a negative type photosensitive resin, it is exposed by an exposing device and has its sensitized part cured as in the case of FIG. 3C to give stability to its shape. The exposing device may be a parallel exposure system used to form patterns for pixels, BM (black matrix), and the like. According to this embodiment, however, any exposing device may be used as long as it can cure a concave and convex pattern formed in advance. For that, all that is necessary is to provide an amount of exposure equal to or larger than the amount needed to cure the photocurable resin.

The exposure may be carried out before or after the removal of temporary support structures such as the base film 52 and underlying layer 51. A cushion layer may be provided on the base film to increase adhesion and conformance to the substrate.

According to this embodiment, when pressing the concave and convex pattern-bearing film 50 consisting of the underlying layer 51 and base film 52 against the thin film layer 53 formed on the glass substrate 5 in advance, the thin film layer 53 and method of its formation may be the same as those described above. Preferably, however, the exposure of the thin film layer 53 is carried out after the concave and convex pattern-bearing film 50 is pressed against it.

The index of refraction of the transparent resin used for the thin film layer 53 which makes up the aperture-forming lenses 3 is higher than that of the flattening layer 3a by 0.02 to 0.25. More preferably, it is higher by 0.05 to 0.15. When the difference Δn in the index of refraction between the aperture-forming lenses 3 and flattening layer 3a is smaller than 0.02, in order for the focal length of the aperture-forming lenses 3 to be between 0.5 and 0.7 mm, which is approximately equal to the thickness of the glass substrate 5, the radius of curvature of the aperture-forming lenses 3 must be smaller than 10 μm. However, this makes it difficult to build the transfer die used to form the underlying layer 51. Thus, the difference smaller than 0.02 is unsuitable.

On the other hand, when Δn exceeds 0.25, in order for the focal length of the aperture-forming lenses 3 to be between 0.5 and 0.7 mm, which is approximately equal to the thickness of the glass substrate 5, the radius of curvature of the lens must be 100 μm or larger and the depth of the lens must be smaller than 0.1 μm. Again, this makes it difficult to build the transfer die used to form the underlying layer 51, and thus the difference larger than 0.25 is unsuitable. Incidentally, the method for building the transfer die will be described later.

Second Embodiment

Figure 4:
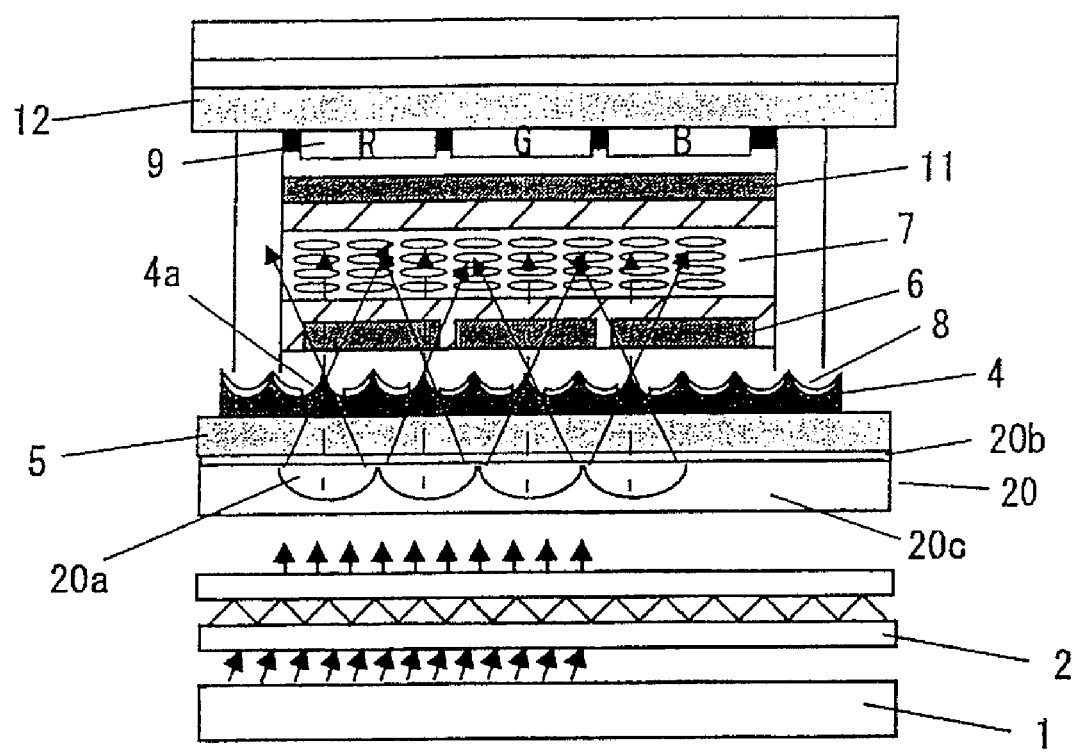
FIG. 4 is a sectional view illustrating a transflective type liquid crystal display according to a second embodiment of the present invention.

A second embodiment will be described with reference to FIG. 4. A liquid crystal display in FIG. 4 is the same as the one shown in FIG. 1 except that an aperture-forming lens-equipped film 20 is used instead of the aperture-forming lenses 3. The aperture-forming lens-equipped film 20 is pasted to the glass substrate 5. Since the film 20 is equipped with aperture-forming lenses 20a, it can collect light led from the back light 1 and pass it through the apertures in the diffuse reflector layer 4. Also, the aperture-forming lens-equipped film 20 has a flattening layer 20c under the aperture-forming lenses 20a to flatten a concave and convex pattern of the lenses.

Figure 5:
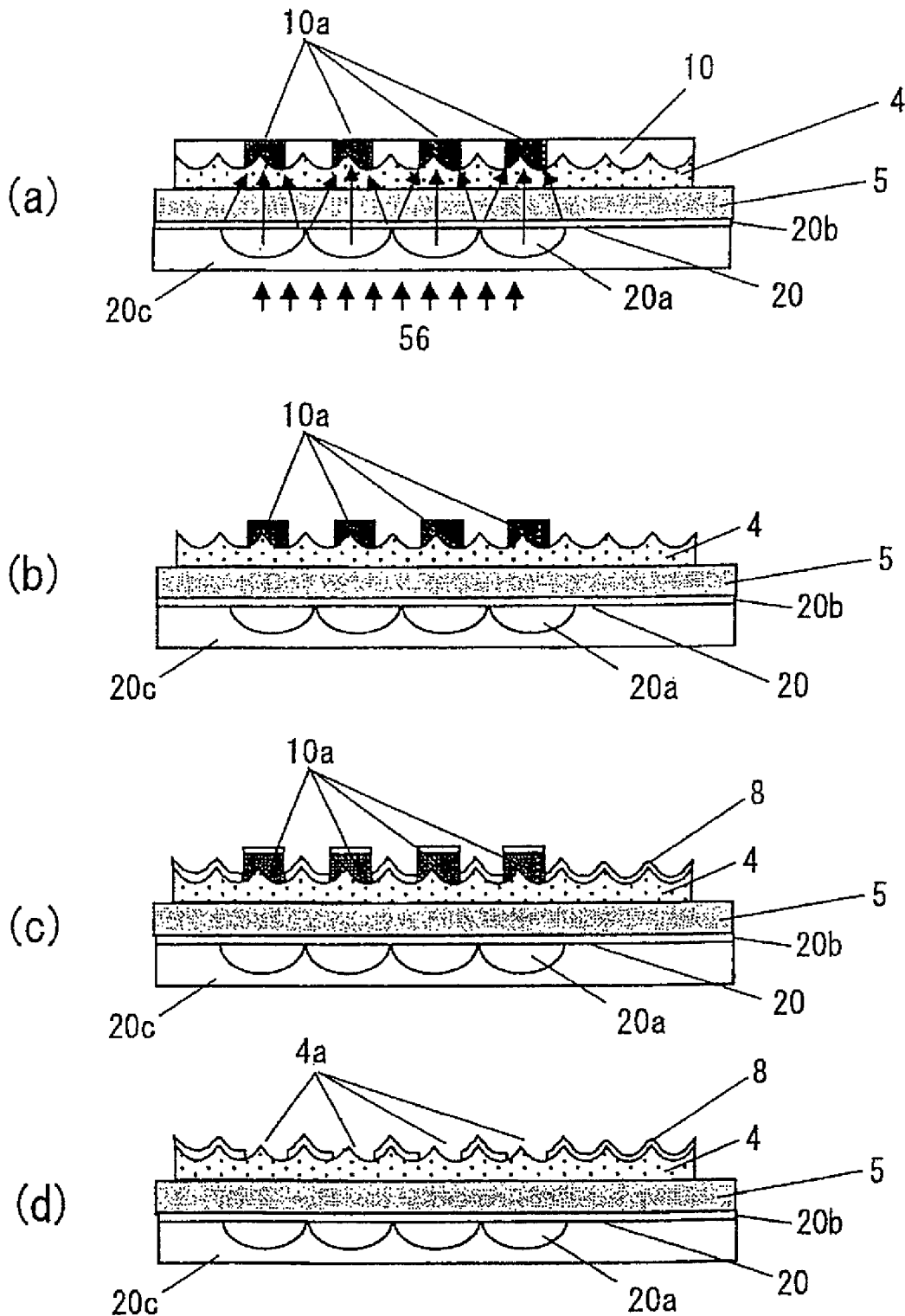
FIG. 5 is a process chart illustrating a manufacturing process of a diffuse reflector layer in the second embodiment.

FIG. 5 is an explanatory diagram illustrating a manufacturing process for forming the apertures 4a in the diffuse reflector layer 4 using the aperture-forming lens-equipped film 20. FIG. 5A shows the glass substrate 5 on which the diffuse reflector layer 4 is formed, where the upper surface of the diffuse reflector layer 4 is coated with the positive type photosensitive resin 10. The aperture-forming lens-equipped film 20 is pasted to the lower surface of the glass substrate 5.

Now, a manufacturing method of the apertures 4a will be described. The aperture-forming lens-equipped film 20 pasted to the glass substrate 5 is irradiated with actinic light 56 such as UV light. The actinic light 56 is collected by the aperture-forming lenses 20a on the film 20 and directed at the photosensitive resin on the diffuse reflector layer 4. Consequently, photo masked part 10a of the photosensitive resin 10 is sensitized as indicated by solidly shaded areas in FIG. 5A.

Next, unnecessary part of the photosensitive resin 10 is removed by etching, leaving the photomasked part 10a on the diffuse reflector layer 4 as shown in FIG. 5B. Next, the metal film 8 of aluminum, silver, or the like is deposited on the diffuse reflector layer 4 by sputtering or other method. Consequently, the metal film 8 is deposited on the diffuse reflector layer 4 and photomask 10a as shown in FIG. 5C.

Then, as the photomask 10a is lifted off, it is removed together with the metal film 8 on it to form the transmission apertures 4a as shown in FIG. 5D. Since the apertures 4a are formed by exposure using the aperture-forming lens-equipped film 20, their center positions coincide with those of the aperture-forming lenses 20a without misalignment. Also, since the metal film 8 remains on the diffuse reflector layer 4 except for the apertures 4a, the light incident upon the diffuse reflector layer 4 is reflected.

Third Embodiment

Figure 6:
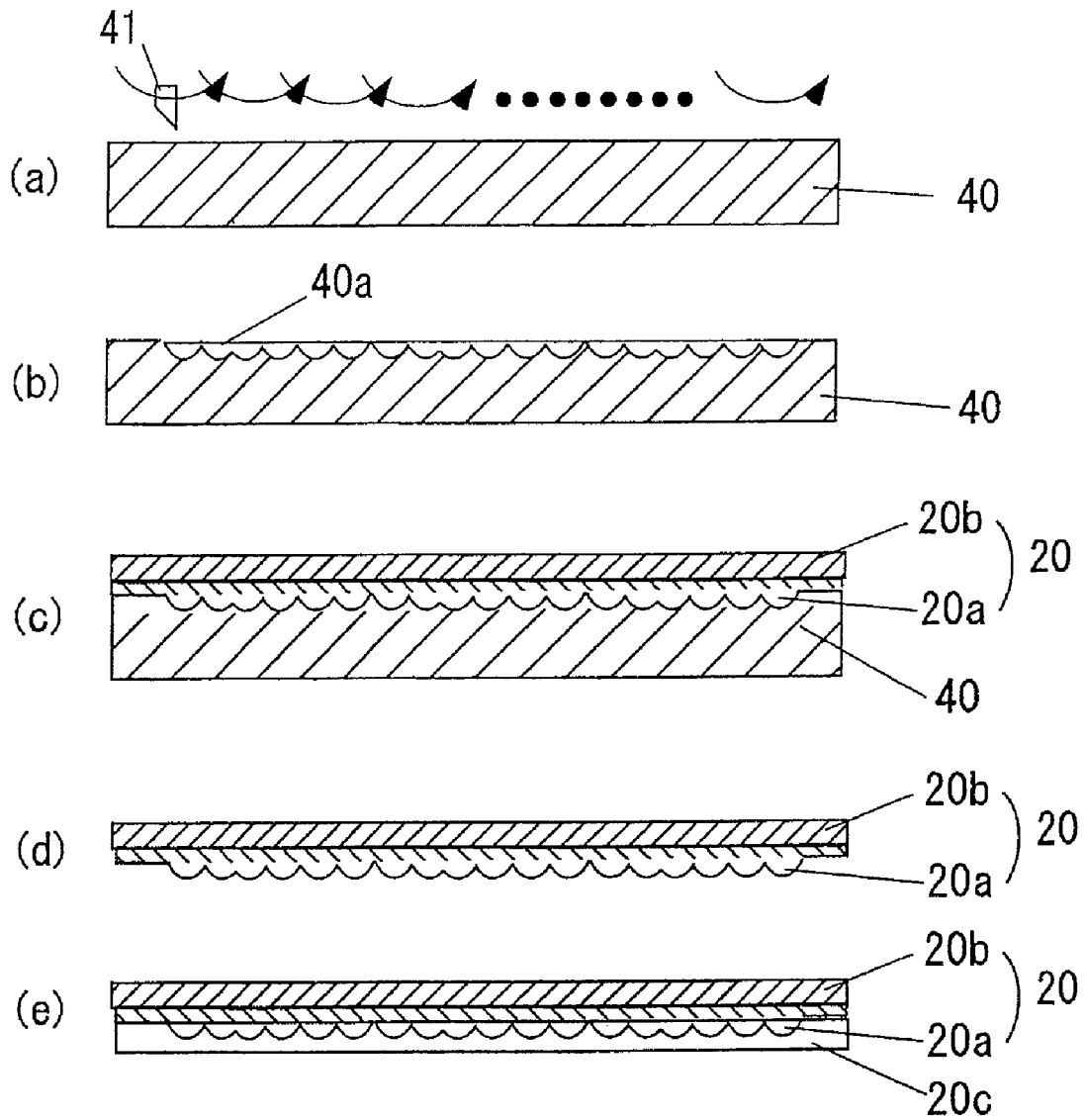
FIG. 6 is a process chart illustrating a process for manufacturing an aperture-forming lens-equipped film in the second embodiment.

A third embodiment will be described. This embodiment relates to a manufacturing method for an aperture-forming lens-equipped film. It will be described with reference to FIG. 6. FIG. 6 is a sectional view illustrating a process for manufacturing the aperture-forming lens-equipped film 20. FIG. 6A is a partial sectional view of a die used to manufacture the aperture-forming lens-equipped film 20. In FIG. 6A, lens-shaped concave curves 40a are cut on a surface of a die 40 using a cutting tool 41. Preferably, a diamond cutting tool is used as the cutting tool 41 because this will give superior surface roughness to the lens-shaped concave curves 40a of the die. As a result of the cutting, the die 40 is completed as shown in FIG. 6B.

The die 40 has the concave curves 40a. FIG. 6C is a sectional view of the aperture-forming lens-equipped film 20 consisting of the die 40, a microlens member 20a, and a base film 20b. The aperture-forming lens portion 20a installed on the base film 20b is pressed against the concave curves 40a of the die 40. Consequently, the shape of the concave curves 40a is transferred to the aperture-forming lens member 20a. Then, the base film 20b and aperture-forming lens member 20a are separated from the die 40.

FIG. 6D is a sectional view of the aperture-forming lens-equipped film 20 consisting of the transferred aperture-forming lens member 20a and base film 20b. The concave curves 40a formed on the die 40 provides a convex pattern as a result of reverse formation as shown in FIG. 6D. Next, the flattening layer 20c is formed to flatten the convex aperture-forming lens member 20a.

FIG. 6E is a sectional view of a laminate consisting of the flattening layer 20c and aperture-forming lens-equipped film 20 which in turn consists of the transferred aperture-forming lens member 20a and base film 20b.

In this way, the aperture-forming lens-equipped film 20 can be produced by pressing the die 40 against the aperture-forming lens member 20a which is deformable. The deformable aperture-forming lens member 20a is installed on the base film 20b using a plastic film which in itself is deformable. Incidentally, heat, light, or the like may be applied in the pressing process.

The die 40 in the above example has been planar in shape, but a roll-shaped die 40 will make it possible to carry out reverse formation of the aperture-forming lens-equipped film 20 continuously, resulting in efficient production of the film.

Figure 7:
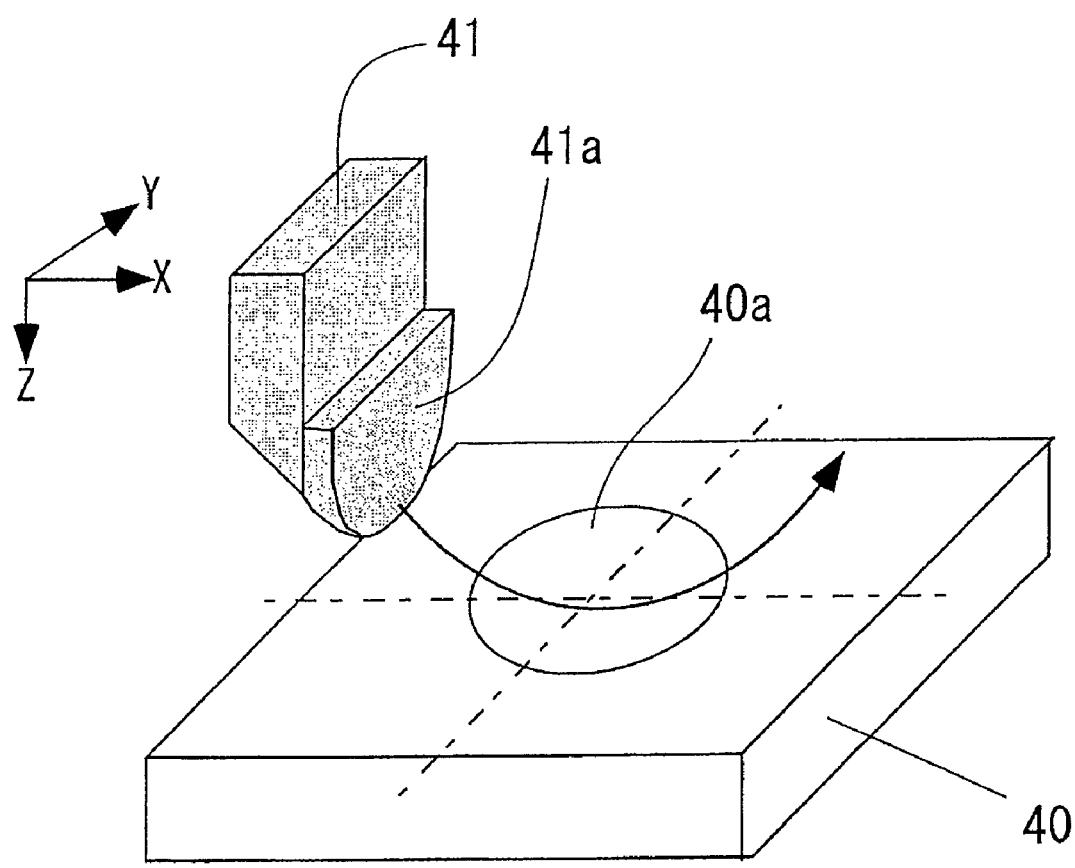
FIG. 7 is a perspective view illustrating a method for cutting die surfaces using a diamond cutting tool in the second embodiment.

The die 40 is manufactured using the cutting tool 41 which is a diamond cutting tool equipped with a diamond tip 41a as shown in FIG. 7. The concave curves 40a can be cut in the die 40 by moving the cutting tool 41—which is a diamond cutting tool—in the direction indicated by the arrow.

Figure 8:
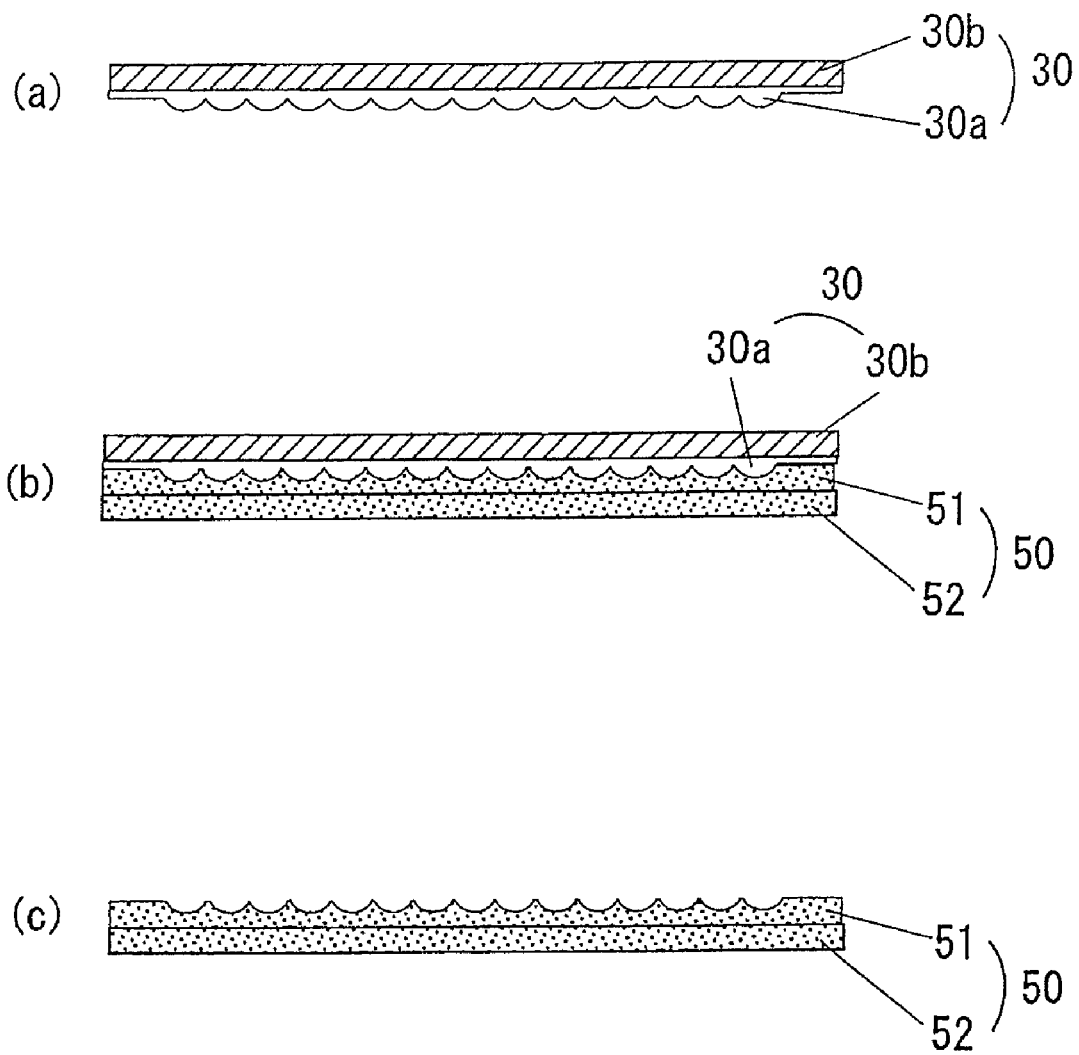
FIG. 8 is a process chart illustrating a process for manufacturing a concave and convex pattern-bearing film according to a third embodiment of the present invention.

Now, description will be given of a method for forming the concave and convex pattern-bearing film 50 on the transfer laminate 59 illustrated in FIG. 3 using the die illustrated in FIG. 7. FIG. 8 is a sectional view showing a process for manufacturing a concave and convex pattern-bearing film. First, a convex lens-equipped film 30 shown in FIG. 8A is formed using the method described with reference to FIGS. 6A to 6D. Next, as shown in FIG. 8B, using the convex lens-equipped film 30 as a transfer master pattern, a reverse pattern is produced by reverse formation on the underlying layer 51 and base film 52 prepared beforehand. The underlying layer 51 on the base film 52 is pressed by a convex lens member 30a of the convex lens-equipped film 30. Consequently, the shape of the convex lens member 30a is transferred to the underlying layer 51. Then, the base film 52 and underlying layer 51 are separated from the convex lens-equipped film 30. FIG. 8C is a concave lens-equipped film 50 consisting of the transferred underlying layer 51 and base film 52. The under lying layer 51 has a concave curved pattern as a result of the reverse formation. In this way, the concave lens-equipped film 50 can be produced by pressing the convex lens-equipped film 30 against a deformable underlying layer 51.

The underlying layer 51 is a plastic film which in itself is deformable. The deformable underlying layer 51 is installed on the base film 52. Incidentally, heat, light, or the like may be applied in the pressing process.

According to this embodiment, since the aperture-forming lenses 3 are produced using, as a transfer master pattern, a film material which in turn is formed using a die built by cutting, lenses with high form accuracy can be formed on the glass substrate 5. Also, a sectional profile with high efficiency of light usage such as a quadratic profile can be given to the lenses. This is because by setting tool geometry and tool path to a desired lens profile, it is possible to set the lens profile of the transfer master pattern to a desired profile.

Also, this embodiment makes it easy to arrange the apertures 4a in the diffuse reflector layer 4 either regularly or irregularly. This can be achieved by arranging lenses locations at desired positions when cutting the die which is a transfer master pattern. The irregular arrangement is effective in reducing moire on screen.

Fourth Embodiment

Figure 9:
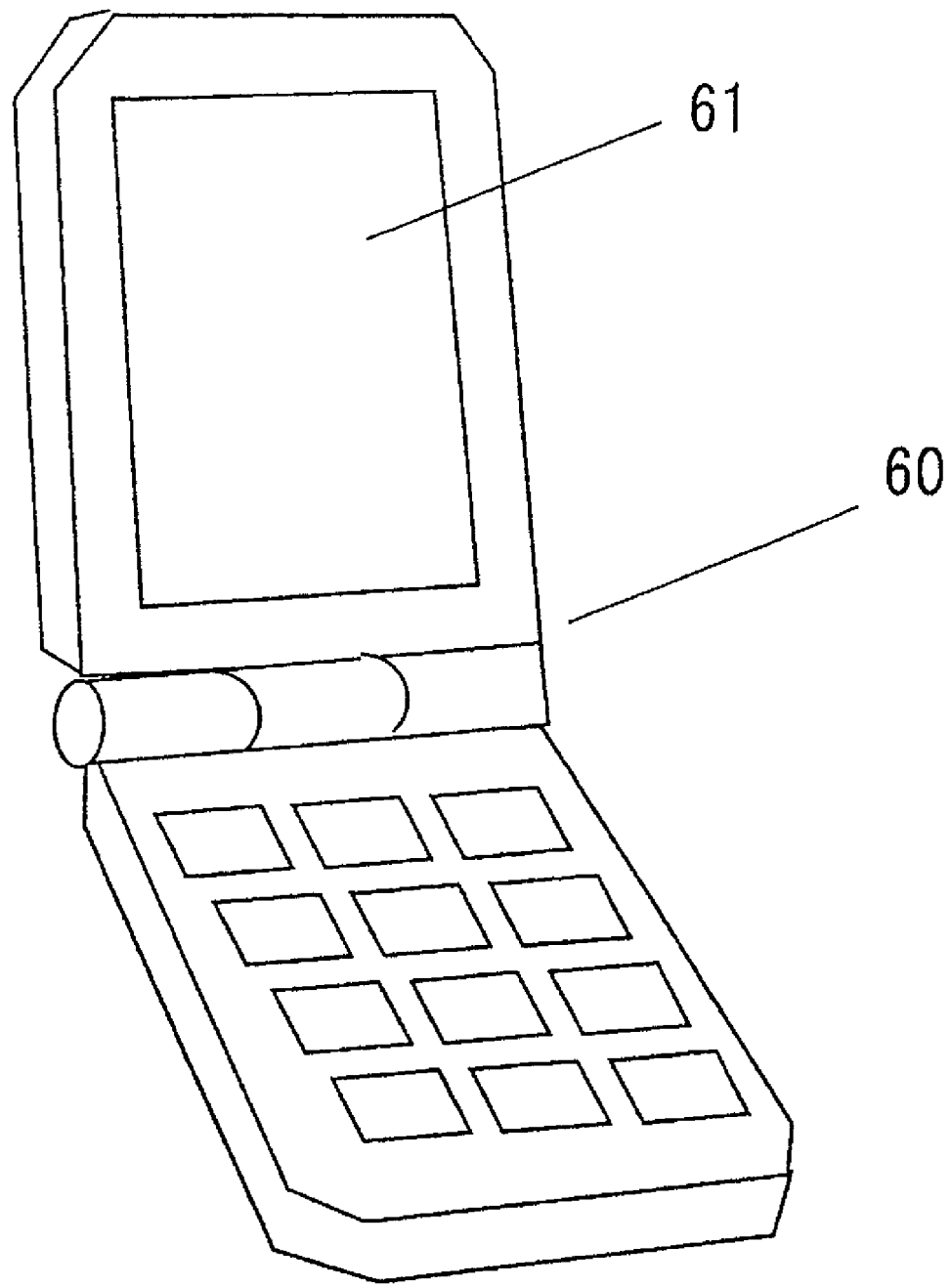
FIG. 9 is an explanatory diagram illustrating a cell phone equipped with a transflective type liquid crystal display according to a fourth embodiment of the present invention.

FIG. 9 is a diagram showing an embodiment of a cell phone which uses a transflective type liquid crystal display for a display area used to display transmitted or received information, where the transflective type liquid crystal display employs a diffuse reflector layer manufactured by a method according to the present invention. FIG. 9 shows appearance of a cell phone 60 which is equipped with a transflective type liquid crystal display 61 according to the present invention. Being equipped with the transflective type liquid crystal display 61 according to the present invention, the cell phone 60 provides a screen with excellent visibility regardless of whether an external light or internal lighting source is used.

Although the cell phone 60 is cited in the above embodiment, the liquid crystal display according to the present invention is applicable to any personal digital assistant used in outdoor environments. That is, although not illustrated, by using the transflective type liquid crystal display described above as a display area of a personal digital assistant to display information stored in a storage unit, it is possible to implement a screen with excellent visibility regardless of whether an external light or internal lighting source is used.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

We claim:

1. A method for producing apertures in a diffuse reflector layer having a metal reflection film, comprising the steps of:
    forming a diffuse reflector layer on a surface of a glass substrate opposite to a surface of the glass substrate on which aperture-forming lenses are formed;
    forming a positive type photosensitive film on the diffuse reflector layer and then subjecting the photosensitive film to exposure and development via self-alignment using the aperture-forming lenses, leaving a remained photosensitive film;
    forming a metal film on the diffuse reflector layer including on the surface of the remained photosensitive film; and producing apertures in the metal film by removing the remained photosensitive film, such that a center position of the apertures is coaxial with a center position of the aperture-forming lenses.

2. The method for producing apertures in a diffuse reflector layer having a metal reflection film according to claim 1, further comprising a step of forming the aperture-forming lenses, which comprises the steps of:

forming a concave lens-equipped film using, as a transfer master pattern, a convex lens-equipped film formed by using a die cut to a shape of the aperture-forming lenses;

after forming a thin-film-layer on the concave lens-equipped film, pressing the thin-film-layer-side against the glass substrate; and peeling off the concave lens-equipped film.

3. The method for producing apertures in a diffuse reflector layer having a metal reflection film according to claim 2, further comprising a step of forming a flattening layer on the thin-film-layer having a shape of the aperture-forming lenses transcribed on the glass substrate.

4. The method for producing apertures in a diffuse reflector layer having a metal reflection film according to claim 3, wherein an index of refraction of the thin-film-layer is higher than an index of refraction of the flattening layer by 0.02 to 0.25.

5. The method for producing apertures in a diffuse reflector layer having a metal reflection film according to claim 1, wherein the metal film is made of aluminum or silver.

6. The method for producing apertures in a diffuse reflector layer having a metal reflection film according to claim 1, wherein said metal film is formed by sputtering.

7. The method for producing apertures in a diffuse reflector layer having a metal reflection film according to claim 1, wherein said metal film is formed to have a thickness in a range of 0.01 μm to 1 μm.

\* \* \* \* \*